United States Patent
Josset et al.

(10) Patent No.: US 10,094,928 B2
(45) Date of Patent: Oct. 9, 2018

(54) TURBULENCE OCEAN LIDAR

(71) Applicant: The Government of the United States of America, as represented by the Secretary of the Navy, Washington, DC (US)

(72) Inventors: Damien Josset, Covington, LA (US); Weilin Hou, Slidell, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/438,717

(22) Filed: Feb. 21, 2017

(65) Prior Publication Data
US 2017/0242127 A1  Aug. 24, 2017

Related U.S. Application Data

(60) Provisional application No. 62/297,507, filed on Feb. 19, 2016.

(51) Int. Cl.
*G01S 17/95* (2006.01)
*G01S 7/499* (2006.01)

(52) U.S. Cl.
CPC .............. *G01S 17/95* (2013.01); *G01S 7/499* (2013.01); *Y02A 90/19* (2018.01)

(58) Field of Classification Search
CPC ........ G01S 17/96; G01S 17/499; G01S 17/95; G01S 17/58; G01S 7/4817; G01S 7/4811; G01B 11/26
See application file for complete search history.

(56) References Cited

U.S. PATENT DOCUMENTS

| | | | | | |
|---|---|---|---|---|---|
| 4,893,924 A | * | 1/1990 | Leonard | ................. | G01K 11/12 356/43 |
| 5,270,780 A | * | 12/1993 | Moran | .................... | G01S 17/89 313/373 |
| 8,953,647 B1 | * | 2/2015 | Mead | .................. | H01S 3/06754 12/94 |
| 2006/0083111 A1 | * | 4/2006 | Grasso | ................. | G01S 17/026 367/131 |

(Continued)

OTHER PUBLICATIONS

Delplancke, F., Automated high-speed Mueller matrix scatterometer, Applied Optics, vol. 36, No. 22, Aug. 1, 1997.

(Continued)

*Primary Examiner* — Sang Nguyen
(74) *Attorney, Agent, or Firm* — US Naval Research Laboratory; Scott G. Bell (57) ABSTRACT

Embodiments relate to characterizing underwater turbulence. Initially, multispectral laser light (MLL) is generated and then converted to output laser light (OLL). The OLL is received at a polarization rotator that causes the OLL to be emitted in one of multiple modes of polarization. Next, the OLL is directed toward a target medium, where the OLL causes backscattered light to be emitted from the target medium. While using the polarization rotator to switch between the multiple modes of polarization, Stokes parameters of the backscattered light are detected and then used to characterize the underwater turbulence of the target medium.

15 Claims, 6 Drawing Sheets

(56) References Cited

U.S. PATENT DOCUMENTS

| | | | | |
|---|---|---|---|---|
| 2006/0227317 A1* | 10/2006 | Henderson | ........... | G01B 11/026 356/28 |
| 2008/0170235 A1* | 7/2008 | Rogers | ...................... | G01P 5/26 356/521 |
| 2010/0329291 A1* | 12/2010 | Sanders | ................ | G02F 1/3534 372/22 |
| 2011/0019188 A1* | 1/2011 | Ray | ........................ | B64D 15/20 356/342 |
| 2013/0182259 A1* | 7/2013 | Brezinski | ............. | A61B 5/0066 356/456 |
| 2013/0314694 A1* | 11/2013 | Tchoryk, Jr. | ............ | G01S 17/95 356/28.5 |
| 2015/0219498 A1* | 8/2015 | Tillotson | ................... | G01J 4/04 348/144 |

OTHER PUBLICATIONS

Lara, David, Dainty, Chris, Axially resolved complete Mueller matrix confocal microscopy, Applied Optics, vol. 45, No. 9, Mar. 20, 2006.

Kacenelenbogen, M., et al., an accuracy assessment of the CALIOP/CALIPSO version 2/version 3 daytime aerosol extinction product based on a detailed multi-sensor, multi-platform case study, Atmos. Chem. Phys., 11, 3981-4000, 2011, Apr. 29, 2011.

\* cited by examiner

TURBULENCE OCEAN LIDAR

CROSS-REFERENCE TO RELATED APPLICATIONS

This application is a non-provisional application claiming priority to provisional application 62/297,507 filed on Feb. 19, 2016, under 35 USC 119(e). The entire disclosure of the provisional application is incorporated herein by reference.

BACKGROUND

Fluid flows are typically turbulent and can be characterized by a wide range of coexisting scales of motion. Increased turbulence in a fluid flow results in an increase in energy dissipation, mixing, heat transfer and drag experienced by an object moving through the fluid. The characterization of turbulence is relevant to air navigation, weather forecasting, climatology, resource management, etc.

A variety of methods have been developed to measure turbulence. For example, Sound Navigation and Ranging (SONAR) techniques can be used to characterize turbulence in the ocean. In another example, Doppler Light Detection and Ranging (LIDAR), interferometers, bistatic radars, etc. can be used to characterize air turbulence. LIDAR is particular suitable for characterizing turbulence because (1) visible light penetrates water well (low absorption, medium scattering); (2) no actual physical contact with the water (around 98% transmission at the air/water interface vs 0.12% for acoustic) thus no perturbation of the flow; and (3) ability to provide range resolved information (i.e., depth profiling).

Turbulence is a critical property of the ocean mixed layer and has a direct impact on ocean heat storage and algae photosynthesis. Observing changes in turbulence at the synoptic scale is quite challenging. Research vessels provide a limited geographic and temporal coverage and most systems used to characterize turbulence use in situ instrumentations which disturbs the flow and affects turbulence itself.

SUMMARY

Embodiments relate to characterizing underwater turbulence. Initially, multispectral laser light (MLL) is generated and then converted to output laser light (OLL). The OLL is received at a polarization rotator that causes the OLL to be emitted in one of multiple modes of polarization. Next, the OLL is directed toward a target medium, where the OLL causes backscattered light to be emitted from the target medium. While using the polarization rotator to switch between the multiple modes of polarization, Stokes parameters of the backscattered light are detected and then used to characterize the underwater turbulence of the target medium.

DESCRIPTION

Transceiver geometry can significantly affect the performance of a LIDAR system. Typically, there are 3 types of designs for transceiver geometries: (1) biaxial; (2) coaxial; and (3) in-line. A biaxial design is easy to implement and is best suited for space/airborne applications or a large telescope field of view (i.e., high occurrence of multiple scattering). A coaxial design performs well but has a near field blind zone, which makes it suboptimal for laboratory environments. An in-line design can be difficult due to high power requirements, which can cause light leaks and can saturate/damage receivers. The in-line design has been implemented with infrared (i.e., optical circulator) and a circular polarization such as in high spectral resolution LIDAR (HSRL). With respect to aquatic environments, surface waves can impact the geometry of biaxial and coaxial designs. Specifically, it can be difficult to collect sing-scatter LIDAR measurements like beam attenuation coefficient from a LIDAR system deployed on a ship.

Figure 3:
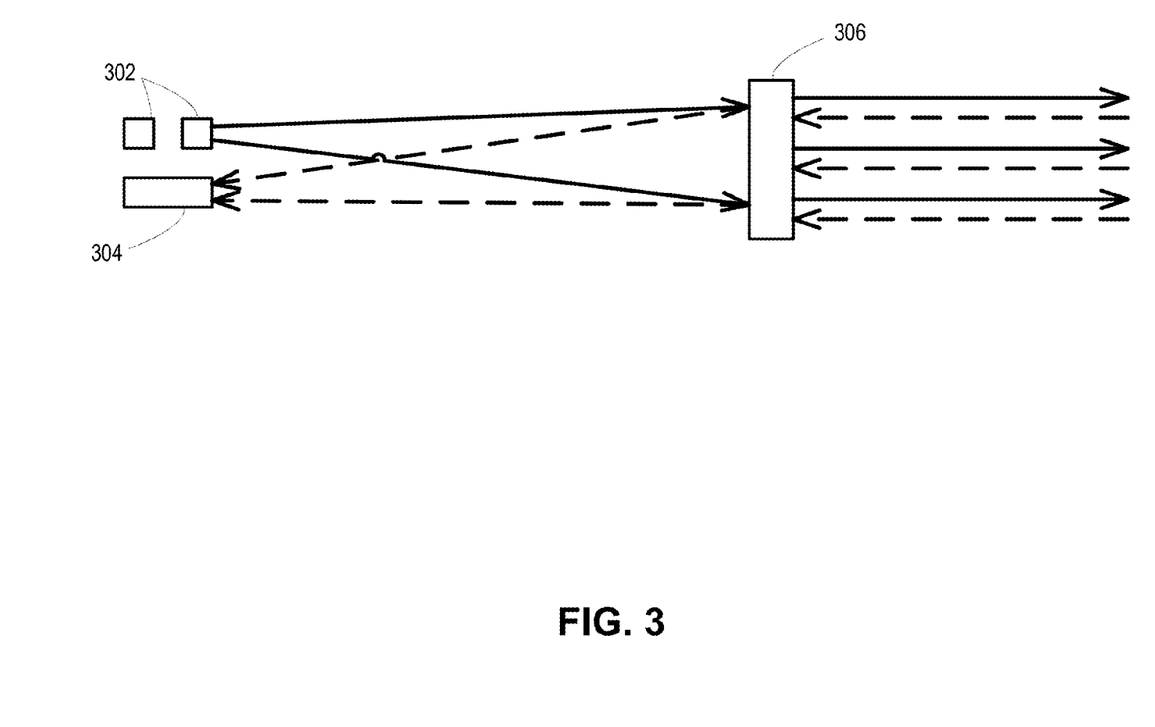
FIG. 3 is an example telescope for performing TURBOL.

Embodiments of TURBOL use a dual-use telescope as shown in FIG. 3 to address the aforementioned issues. The dual-use telescope is used for both emission and reception of light by having a full overlap of laser and receiver's field of view. Such a configuration eliminates the close field blind zone. The dual-use telescope has a quasi-backscatter geometry and a small field of view, preventing large angle multiple scattering. Further, TURBOL is capable of identifying signatures of turbulence in three key properties of light: polarization, color/frequency, and intensity.

Underwater polarization can be used to study the optical signature of inorganic particles in coastal waters from remote sensing. Specifically, recent research has shown that scattering due to optical turbulence can be expressed as a function of the depolarization rate. For example, the ratio of red to green polarized reflectance can be expressed a function of sediment concentration in coastal area. In another example, a mean depolarization rate with error bars can be expressed as a function of the Rayleigh number.

The properties of light are described by the Stokes parameters. TURBOL is capable of retrieving all four of the Stokes parameters according to the LIDAR retrieval equation shown below:

$$M \begin{pmatrix} P_0 \\ P_1 \\ P_2 \\ P_3 \end{pmatrix} = \begin{pmatrix} S_0 \\ S_1 \\ S_2 \\ S_3 \end{pmatrix}, \quad (1)$$

Where M is a LIDAR calibration matrix, $P_n$ are the photomultiplier signals, and $S_n$ are the Stokes parameters. $S_1$ is associated with intensity, $S_2$ and $S_3$ are associated with linear polarization, and $S_4$ is associated with circular polarization. An uncertainty estimate for the Stokes parameters can be calculated as shown below:

$$M^{-1}(\Delta P - \Delta M . S) = \begin{pmatrix} \Delta S_0 \\ \Delta S_1 \\ \Delta S_2 \\ \Delta S_3 \end{pmatrix}, \quad (2)$$

Which can be improved by additional calibration measurements, hardware modification, etc.

Embodiments of TURBOL use a combination of polarizers and quarter wave plate to allow four receiver to be sensitive to three states of polarization. Quarter wave plates allow for analysis of a returned signal that is in a circular polarization state, which provides all four elements of the Stokes vector by the four receivers, including the intensity in addition to the three polarization elements. Each data point provides a measurement vector P. The Stokes Parameters $S_n$, can be obtained from a set of reference measurements as well as the associated uncertainty estimate. The rotation of a quarter wave plate allows for the receiver system to be characterized. Specifically from this derivation of the matrix M, S and $\Delta S$ can be determined.

While the four Stokes parameters describe properties of light, the properties of the medium can be described by a Mueller Matrix with 16 elements from the two equations below:

$$S_{incident} = \begin{pmatrix} S_{0,incident} \\ S_{1,incident} \\ S_{2,incident} \\ S_{3,incident} \end{pmatrix} \quad (3)$$

$$S_{backscatter} = M_{ocean} * S_{incident} \quad (4)$$

Where $S_{incident}$ is incident laser light and $S_{backscatter}$ is backscattered light. Varying the polarization states of the laser light allows all elements of the Mueller Matrix to be retrieved.

TURBOL as described herein also uses two Pockel cells to modulate polarization, which allows the TURBOL system to be switched between three modes of polarization: (1) laser liner polarization ($S_1=-1$, $S_2=S_3=0$); (2) Mode 1 that controls both rotation and ellipticity; and (3) Mode 2 that controls ellipticity.

Figure 1:
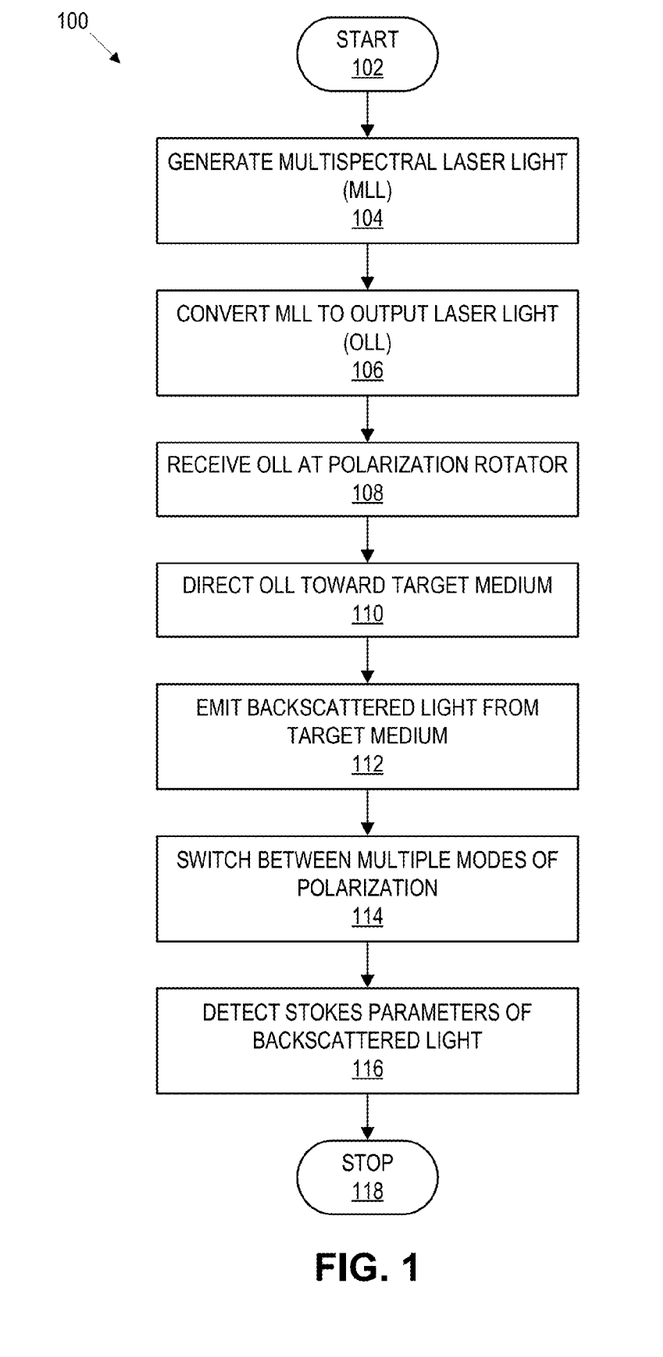
FIG. 1 is an example workflow for turbulence ocean LIDAR (TURBOL)

FIG. 1 an example workflow for TURBOL. As is the case with the other processes described herein, various embodiments may not include all of the steps described below, may include additional steps, and may sequence the steps differently. Accordingly, the specific arrangement of steps shown in FIG. 1 should not be construed as limiting the scope of TURBOL.

In block 102, the method starts and proceeds to block 104, where multispectral laser light (MLL) is generated. For example, the MLL can include four lasers that are eventually 411-703 nm, 532 nm, 1064 nm, and 716-2590 nm. In block 106, the MLL is converted to output laser light (OLL). In this example, an optical parametric oscillator (OPO) can be used to convert the MLL to 411-703 nm and 532 nm lasers. In block 108, the OLL is received at a polarization rotator. The polarization rotator can be used to change a polarization mode of the OLL. Examples of polarization modes include laser liner polarization, Mode 1 for controlling both rotation and ellipticity, and Mode 2 for controlling ellipticity.

In block 110, the OLL is directed toward a target medium. In block 112, the target medium reflects the OLL to return backscattered light. As the OLL is emitted as described above, the polarization mode can be switched between the different modes in block 114. Because the OLL is switched between the three polarization modes, the Stokes parameters of the backscatter light can be detected in block 116. The Stokes parameters can then be used to characterize underwater turbulence in the target medium.

Figure 2:
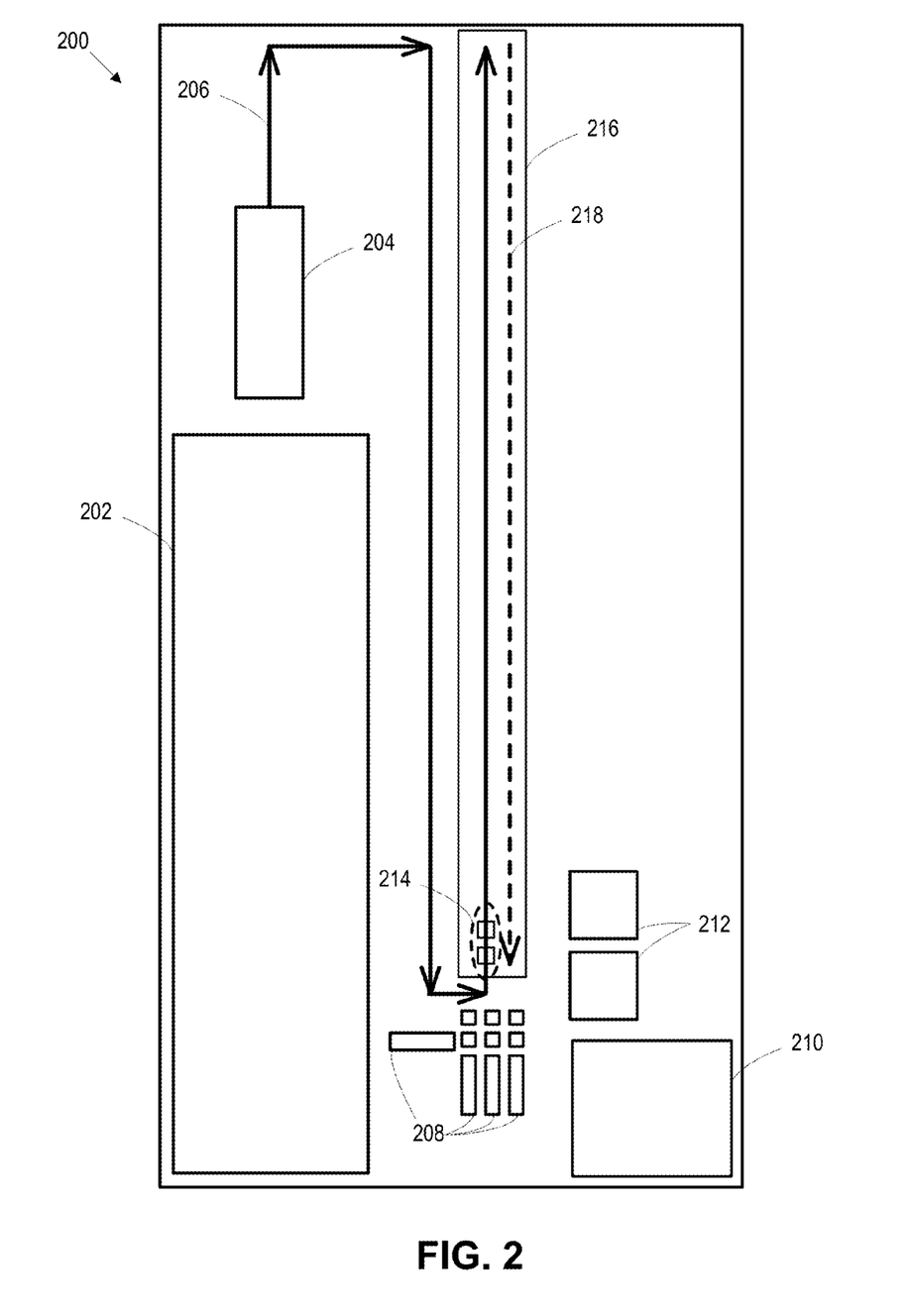
FIG. 2 is an example system for performing TURBOL.

FIG. 2 is an example system 200 for performing TURBOL. The TURBOL system 200 includes a laser pump 200, an OPO 204, photomultiplier modules 208, a peripheral component interconnect (PCI) chassis 210 (e.g., a PXIE chassis), pockels cell drivers 212, and a telescope 216. The laser pump 200 is configured to emit multispectral laser light (MLL), which can be at least partially directed at the OPO 204. The OPO 204 is configured to convert the MLL to output laser light 206 (OLL). The OLL 206 is directed to the telescope 216.

The telescope 216 includes a polarization rotator 214 (i.e., pockel cells). The polarization rotator 214 is configured to change the polarization mode of OLL 204 being directed through the telescope 216. The polarization rotator 214 is controlled by pockel cell drivers 212. The OLL 204 emitted from the telescope 216 is directed to a target medium (not shown), which reflects the OLL 204 as backscattered light 218 in the telescope 216. The telescope 216 is also configured to direct the backscattered light 218 to photomultiplier modules 208.

The photomultiplier modules 208 are configured to detect Stokes parameters of the backscattered light 218. As the polarization mode is changed by the polarization rotator 214, the photomultiplier modules 208 are able to detect different Stokes parameters until all 16 Stokes parameters are detected. In some cases, an interferometric setup such as the one described below with respect to FIG. 5 can be used for the photomultiplier modules 208 to detect Stokes parameters.

The PCI chassis 210 enables components (e.g., pockel cell drivers 212, controller components (not shown), data interfaces (not shown), etc.) of TURBOL system 200 to communicate with each other. The PCI chassis 210 can also act as an enclosure to protect components of TURBOL system 200.

FIG. 3 is an example telescope 300 for performing TURBOL. The telescope 300 includes polarization rotator 302, a small concave lens 304, and a large convex lens 306. OLL of a specified polarization mode is emitted from the polarization rotator 302 towards the large convex lens 306. The OLL is then directed by the large convex lens 306 to a target medium. In FIG. 3, backscattered light reflected by the target medium is returned to the large convex lens 306. Because the same telescope 300 is used for emission and reception, there is (1) full overlap of laser and receiver field of view; (2) no close field blind zone; (3) a quasi-backscatter geometry; and (4) a small field of view (i.e., no large angle multiple scattering). The same telescope 300 can be used for both because of the reciprocality of light propagation. TURBOL uses the same optical path for forward propagation of the light and backward propagation of the backscattered signal to be detected through the same path, which ensures a small collecting angle and eliminates multiple scattered photos. Multiple scatter photos are associated with larger angles relative to the receiver telescope path and field of view.

Figure 4:
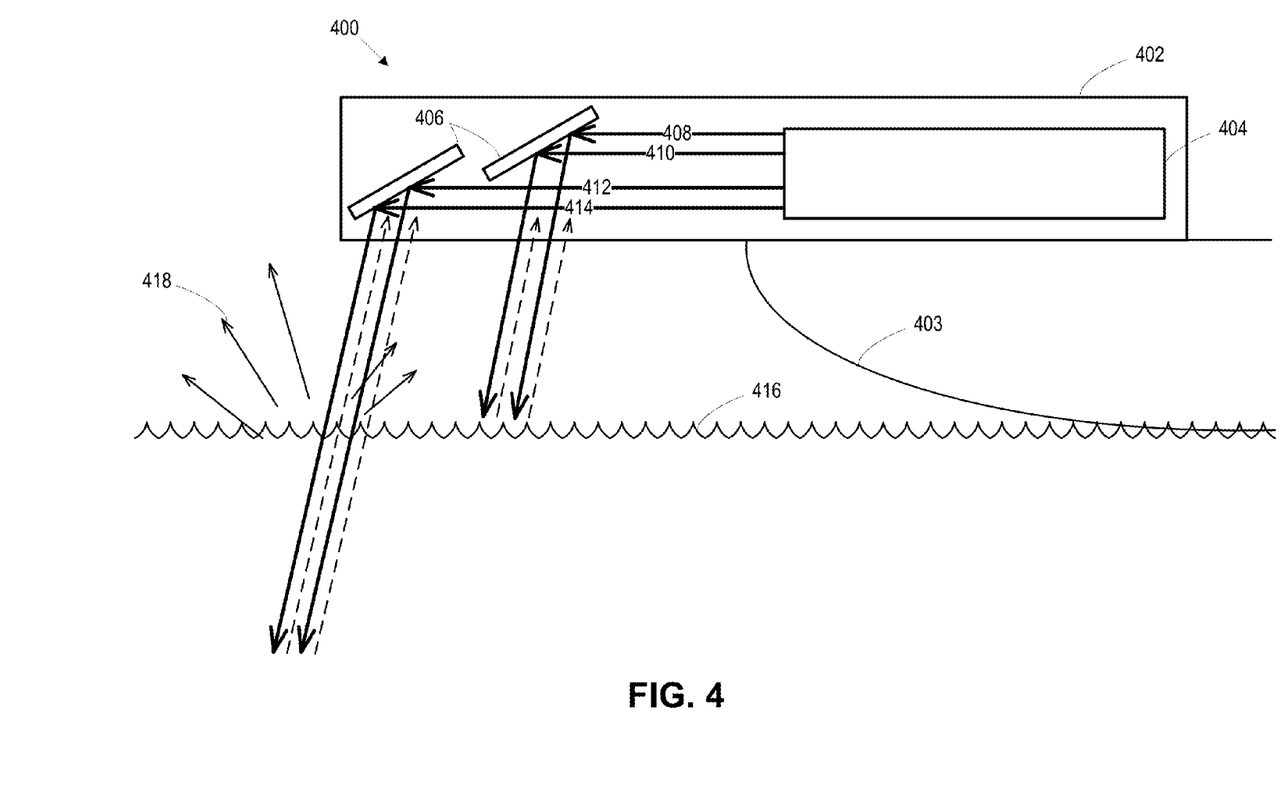
FIG. 4 is an example deployed system on a vessel for performing TURBOL.

FIG. 4 is an example deployed system 400 shown on a vessel 403 for performing TURBOL. The example deployed system 400 includes a laser system 402 and a vessel 403. The laser system 402 can include a TURBOL system 404 that is similar to the example system 200 discussed above with respect to FIG. 2. The laser system 402 also includes mirrors 406 that are configured to reflect OLL emitted from the TURBOL system 404 toward a target medium 416.

For example in FIG. 4, TURBOL system 404 can emit four lasers: (1) 532 nm laser 412; (2) 420-505 nm laser 414; (3) 1064 nm laser 410; and (4) 1200-2035 nm laser 408.

Each of the four lasers is reflected off mirrors 406 towards target medium 416, which reflects backscattered light that is in turn reflected by mirrors 406 back towards the TURBOL system 404. In this example, the polarization mode of each of the four lasers can be modified as backscattered light is detected and used to determine Stokes parameters.

Figure 5:
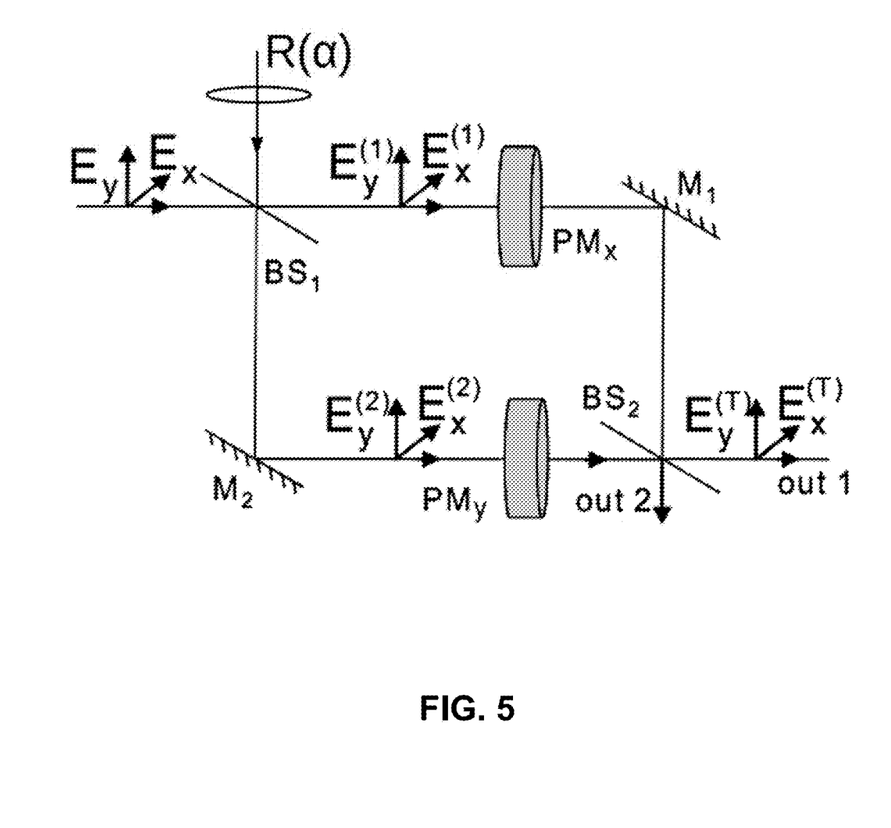
FIG. 5 is an example interferometric setup for performing TURBOL.

FIG. 5 is an example interferometric setup 500 for performing TURBOL. The interferometric setup 500 shows two different paths that are used to extract the influence of the medium on beam propagation laser signals $E_x$, $E_y$ that are mixed with a reference signal $R(\alpha)$ through beam splitter $BS_1$. The first path is directed through photomultiplier $PM_x$ toward mirror $M_1$, and the second path is reflected off mirror $M_1$ toward photomultiplier $PM_y$. Phase changes between photomultiplier $PM_x$ and photomultiplier $PM_y$ are combined by the beam splitter $BS_2$ to be detected as output (out 1, out 2) for characterizing interference patterns, which are used to estimate the state of turbulence strength differences between the two paths. The interferometric setup 500 is capable of self-calibration of the polarization channel and allows for one receiver to provide the four Stokes Parameters (other receivers can then be used for other wavelengths).

Figure 6:
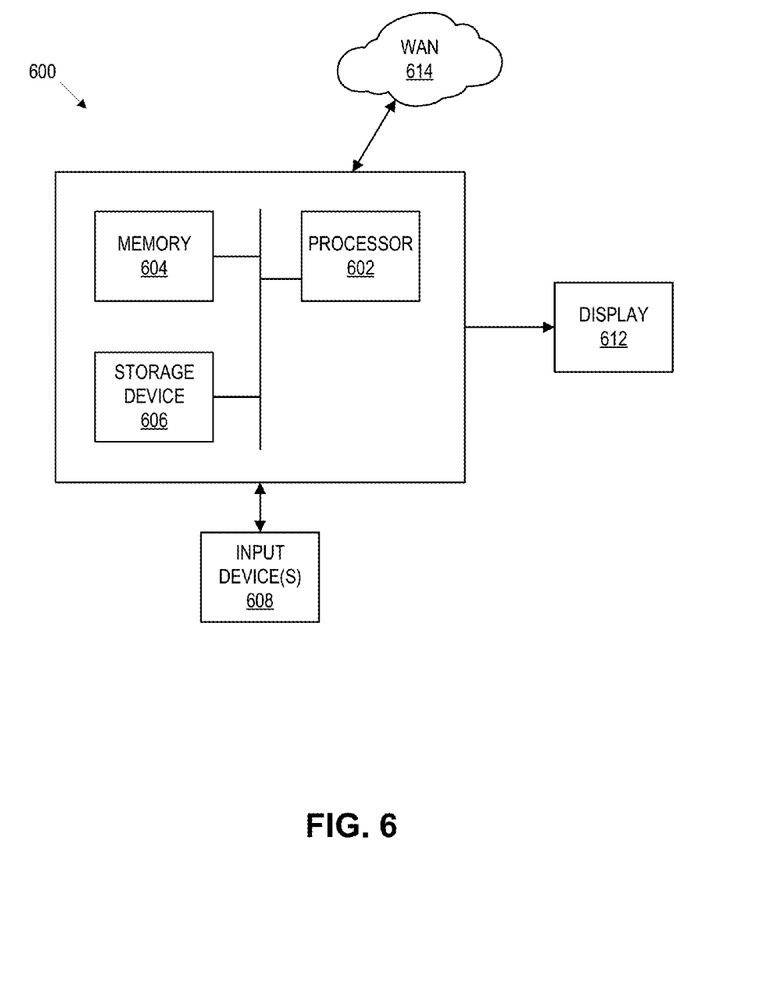
FIG. 6 is a diagram of an example computer system for performing TURBOL.

Components of the invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention (e.g., image module, controller, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system for characterizing underwater turbulence, the system comprising:
   a laser pump to generate multispectral laser light (MLL);
   an optical parameteric oscillator to convert the multispectral laser light to an output laser light (OLL);
   a telescope:
      to receive the OLL at two or more Pockels cells that modulate polarization, and
      to direct the OLL toward a target medium, wherein the OLL causes backscattered light to be emitted from the target medium;
   the Pockels cells to switch between multiple modes of polarization for the OLL; and
   photomultiplier modules to detect Stokes parameters of the backscattered light.

2. The system of claim 1, wherein the telescope has a full overlap of laser and receiver field of view.

3. The system of claim 1, wherein the Stokes parameters comprise intensity, linear polarization, and circular polarization.

4. The system of claim 1, wherein the multiple modes of polarization comprise a laser linear polarization, a first control mode for rotation and ellipticity, and a second control mode for ellipticity.

5. The system of claim 1, wherein the photomultiplier module further comprises an interferometric setup to use a reference signal to characterize interference patterns of the backscattered light, wherein the Stokes parameters are determined based on the interference patterns.

6. A method for characterizing underwater turbulence, the method comprising:
   generating multispectral laser light (MLL);
   converting the MLL to output laser light (OLL);
   receiving the OLL at two or more Pockels cells that cause the OLL to be emitted in one of multiple modes of polarization;
   directing the OLL toward a target medium, wherein the OLL causes backscattered light to be emitted from the target medium;
   while using the Pockels cells to switch between the multiple modes of polarization, detecting Stokes parameters of the backscattered light; and
   characterizing the underwater turbulence of the target medium based on the Stokes parameters.

7. The method of claim 6, wherein the Stokes parameters comprise intensity, linear polarization, and circular polarization.

8. The method of claim 6, wherein the multiple modes of polarization comprise a laser linear polarization, a first control mode for rotation and ellipticity, and a second control mode for ellipticity.

9. The method of claim 6, wherein elements of a Mueller Matrix are determined based on the Stokes parameters for each of the multiple modes of polarization, and wherein the Mueller Matrix is used to characterize the underwater turbulence.

10. The method of claim 6, wherein detecting the Stokes parameters of the backscattered light further comprises a reference signal to characterize interference patterns of the backscattered light, wherein the Stokes parameters are determined based on the interference patterns.

11. A non-transitory computer-readable medium comprising executable instructions for causing a turbulence system to:
   generate multi spectral laser light (MLL);
   convert the MLL to output laser light (OLL);
   receive the OLL at two or more Pockels cells that cause the OLL to be emitted in one of multiple modes of polarization;
   direct the OLL toward a target medium, wherein the OLL causes backscattered light to be emitted from the target medium;
   while using the Pockels cells to switch between the multiple modes of polarization, detect Stokes parameters of the backscattered light; and characterize the underwater turbulence of the target medium based on the Stokes parameters.

12. The non-transitory computer-readable medium of claim 11, wherein the Stokes parameters comprise intensity, linear polarization, and circular polarization.

13. The non-transitory computer-readable medium of claim 11, wherein the multiple modes of polarization comprise a laser linear polarization, a first control mode for rotation and ellipticity, and a second control mode for ellipticity.

14. The non-transitory computer-readable medium of claim 11, wherein elements of a Mueller Matrix are determined based on the Stokes parameters for each of the multiple modes of polarization, and wherein the Mueller Matrix is used to characterize the underwater turbulence.

15. The non-transitory computer-readable medium of claim 11, wherein detecting the Stokes parameters of the backscattered light further comprises a reference signal to characterize interference patterns of the backscattered light, wherein the Stokes parameters are determined based on the interference patterns.

\* \* \* \* \*